Aug. 11, 1959     W. B. ZERN     2,898,956
BRAKE FOR ELECTRIC HAND TOOL
Filed Oct. 24, 1957
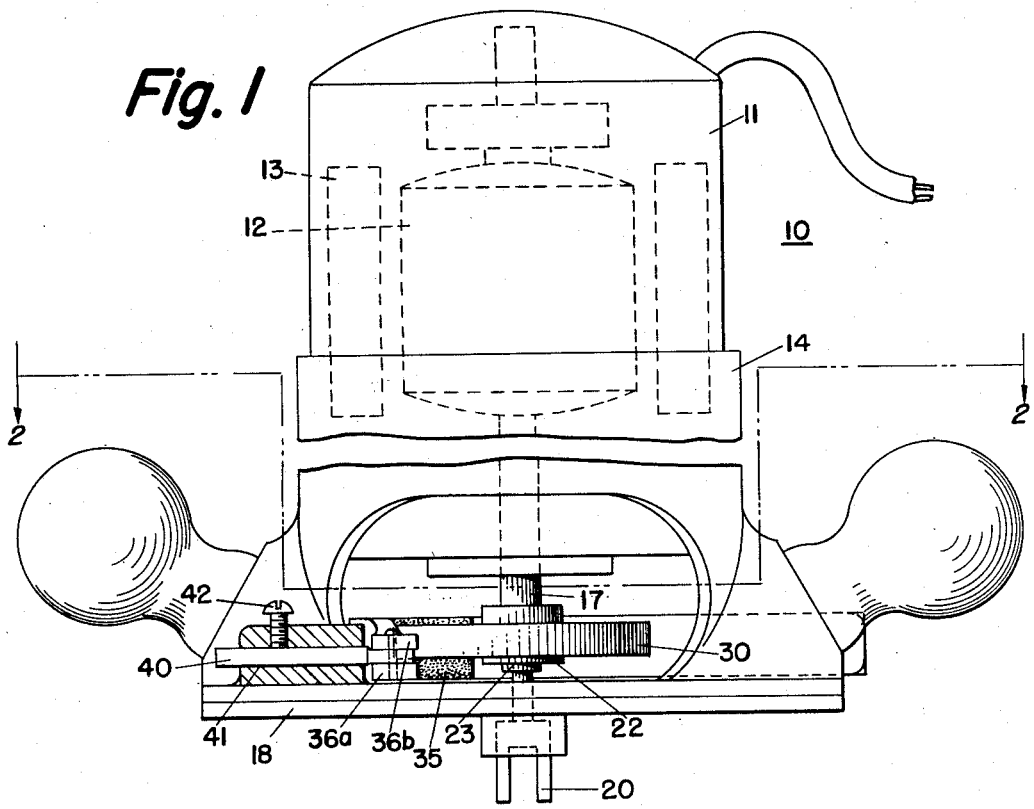
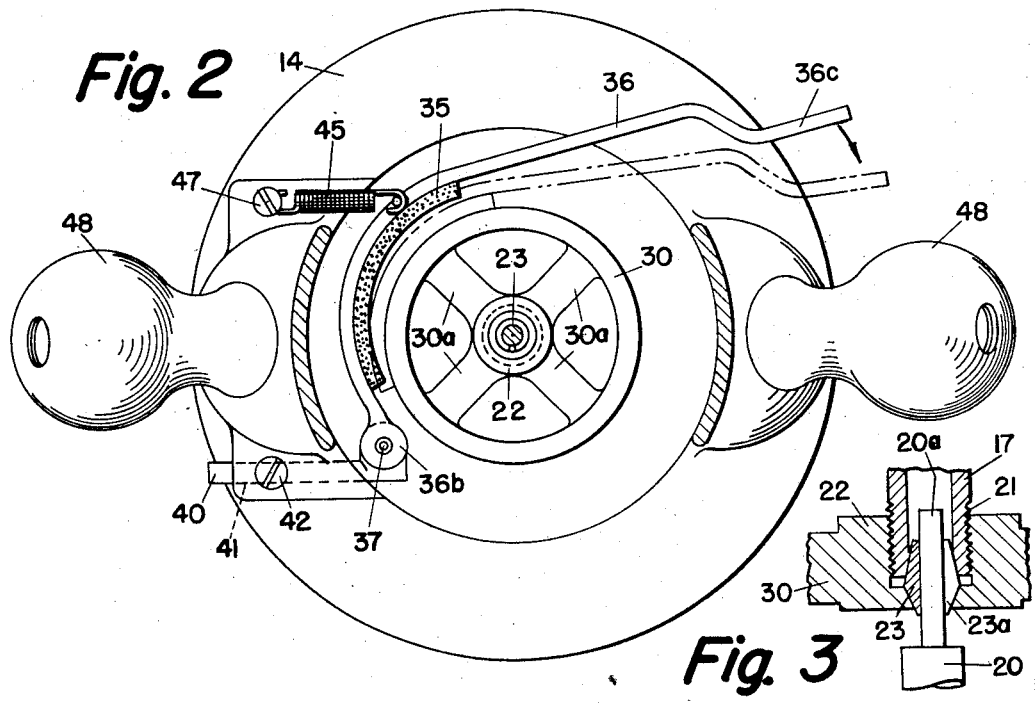

United States Patent Office 2,898,956
Patented Aug. 11, 1959

2,898,956

BRAKE FOR ELECTRIC HAND TOOL

Warren B. Zern, near Pottstown, Pa.

Application October 24, 1957, Serial No. 692,073

7 Claims. (Cl. 144—134)

This invention relates to a brake for a portable electric hand tool and has for an object the provision of a manually operable brake for quickly stopping the rotating tool element of the hand tool.

This invention is particularly applicable to portable electric hand tools of the type known in the art as routers which employ an electric motor for driving a cutting tool element with the motor being supported on a base frame. Routers are particularly suited for cutting recesses such as hinge seats or lock plate seats in the construction of door units. To define the area over which the router is to be moved in cutting such seats, it is particularly advantageous to employ template assemblies such, for example, as the type disclosed in my Patent 2,801,655. These assemblies are particularly useful for quickly and accurately routing hinge seat in a jamb and a door as well as the recesses for the door lock and striker plate on the jamb. Such assemblies include a template of relatively soft material such, for example, as aluminum for guiding the routing tool in the manner described in the aforesaid patent. In order to prevent the cutting element of the router from damaging the template when the router is removed from the template assembly at the completion of a routing operation, it is necessary that the operator exercise considerable care in such withdrawal or that the rotation of the cutting tool be completely stopped before the tool is withdrawn from the opening in the templates. If these precautions are not taken, the cutting tool may strike the template and damage it. This will require replacement of the template resulting in loss of time and production.

During the normal operation of a router the cutting tool is hidden from view of the operator since it extends beneath the base frame of the router. The rotor of a router has considerable inertia and thus after a routing operation has been completed and the motor shut off it is necessary for the operator to wait several seconds before the cutting tool will come to a stop so that the router may be removed from the template assembly without danger of damage to the template or injury to the operator. If this procedure is not followed there is considerable danger that the template will be damaged by the rotating cutting tool as it is withdrawn from the template assembly since the cutter is obscured from the operator's view. In the production of pre-hung door units time is extremely important in order that the cost of producing the units may be reduced to a minimum.

Accordingly, it is an object of the present invention to provide a hand brake for a portable electric router so that the operator can bring the cutting tool of the router to rest immediately after he has completed a routing operation for maximum safety of the operator and so that the router may be removed rapidly from the work without danger of damaging any of the guiding structure such, for example, as the aforesaid template assemblies which control the area over which the router operates.

In accordance with the present invention there is provided a portable electric hand tool such as a router including frame structure and a driven rotatable member supported thereon. The driven member is provided with a threaded shaft extension which is adapted to cooperate with chuck means including a threaded nut for securing a tool holder to the shaft extension for rotation therewith. A braked rum is carried by the nut for rotation with the shaft extension and handles are provided on the frame structure for guiding the hand tool during its operation. The frame structure is provided with a brake lever, one end of which is disposed adjacent the handle for manipulation by the operator into engagement with the drum without release of the handle by the operator thereby permitting the operator to have complete control over the tool during the braking operation.

For a more detailed disclosure of the invention and for further objects and advantages thereof, reference is to be had to the following description taken in conjunction with the accompanying drawings in which:

Fig. 1 is an elevation of a router embodying the present invention;

Fig. 2 is a sectional view taken along the lines 2—2 in Fig. 1 and showing the brake lever in its normal and braking positions; and Fig. 3 is a fractional sectional view through the brake drum shown in Figs. 1 and 2.

As may be seen in Fig. 1, the portable hand tool to which the present invention has been applied is an electric router 10 which includes an electric motor 11 having a rotor 12 and a stator 13. The outer surface of the housing for the motor 11 is provided with a threaded portion which is adapted to cooperate with an internally threaded portion of a base frame 14 of the router. The base frame 14 is adapted to support the motor 11 with a shaft extension 17 of rotor 12 at a predetermined position relative to a base plate 18 of frame 14 so that a cutting tool 20 will extend the proper distance for making a controlled depth of cut in the work. The motor 11 is adapted to be turned on and off by a suitable switch, not shown, and thus far described the router parts are conventional and well known in the art.

As may be seen in Fig. 3 the shaft extension 17 is provided with exterior threads 21 which are adapted to cooperate with the internal threads on a nut member 22. The interior of the shaft extension 17 and the nut 22 are provided with conical or tapered surfaces which are adapted to cooperate with corresponding surfaces on a tool holder or collet 23. The tool holder 23 is provided with a slot, one surface 23a of which is shown in Fig. 3. When the nut 22 is tightened on the threaded shaft extension 17 the tool holder 23 is automatically centered with respect to these members by reason of the tapered surfaces and the tool holder 23 will be clamped tightly around the shank 20a of the cutting tool 20.

In accordance with the present invention the threaded member 22 is provided with a brake drum 30. The brake drum 30 may be rigidly secured to the member 22 in any suitable manner, for example as by welding or brazing so that the nut 22 forms a hub for the drum 30 or the drum 30 may be formed from a casting having an integral hub portion 22 which is internally threaded similar to a nut and thus the aforesaid welding or brazing operation will be eliminated. The brake drum 30 has a smooth peripheral surface which is adapted to be engaged by a suitable brake shoe. To minimize the weight of the brake drum and thus the wear on the bearings of the rotor 12, the brake drum 30 preferably is provided with cut-out areas between the radial arms 30a, Fig. 2.

To cooperate with the brake drum 30 there is provided a brake shoe 35 which may be made from conventional brake lining material and is secured to a brake lever 36. The portion of the brake lever 36 to which the brake liner 35 is secured is curved to closely approximate the curvature of the brake drum 30. One end of the brake lever 36 is bifurcated as indicated by reference characters 36a and 36b, Fig. 1, with a pivot pin 37 extending through the bifurcated end to form a pivot for the lever 36. The pin 37 is adapted to extend through an eye in one end of a rod 40 to secure the latter between the bifurcated members 36a and 36b of lever 36. The opposite end of rod 40 is adapted to extend through an opening 41 which is bored in the frame structure 14. The rod 40 is adapted to be adjusted within the opening 41 until the brake shoe 35 is moved to proper relation with the brake drum 30. The rod 40 is then locked in place by suitable means, such for example as a set screw 42, Figs. 1 and 2.

To hold the brake lever 36 and thus the brake shoe 35 out of engagement with the periphery of the brake drum 30 during the routing operation, there is provided a tension spring member 45, Fig. 2. One end of the spring 45 is connected to the brake lever 36 and the opposite end of the spring 45 is connected to the frame structure 14 as by a screw 47. The spring 45 functions to bias the brake lever 36 to the full line position as shown in Fig. 2. This is the normal position of the brake lever 36 with the brake lining 35 out of engagement with the brake drum 30. It will be noted that the handle end 36c of the brake lever 36 is disposed adjacent one of the handles 48 which are used by the operator to guide the router 10 during a routing operation. By locating the handle 36c of brake lever 36 in this position the operator can grip the handle 36c with one or more fingers and move the brake lever 36 from its full line position to the phantom line position shown in Fig. 2. The phantom line position shows the brake lever 36 and the lining 35 in the braking position with the brake liner 35 in engagement with the periphery of the brake drum 30.

With this construction, after the operator shuts off the motor switch, he can stop the rotor 12 in a minimum amount of time by applying the brake lever 36 against the drum 30 and thus bring the cutting tool 20 of the router to rest without removing his hands from the handles 48. Thus the operator continues to have complete control of the routing tool 10 but at the same time is able to stop the rotation of the cutting element 20 quickly and thereby enable the routing tool 10 to be removed from the work without danger of damage to the template or any other guiding structure which is being used to control the area within which the router is being operated.

From the foregoing description it will be seen that the manually operable brake may be provided on new tools as original equipment or by reason of its simplicity of construction it may be provided as an attachment to existing equipment.

While there has been described a preferred embodiment of the invention, it will be understood that further modifications may be made without departing from the spirit and scope of the invention as set forth in the appended claims.

What is claimed is:

1. A portable electric hand tool comprising a frame, a driven rotatable member supported by said frame, chuck means carried by said rotatable member adapted to support a tool element for rotation therewith, a brake drum integral with said chuck means, and a brake shoe associated with said frame and movable into engagement with said drum to retard the rotation of said rotatable member and said tool element.

2. A router comprising an electric motor having a rotor, a frame for supporting said motor, said rotor being supported for rotation relative to said frame, chuck means carried by said rotor, a cutting tool carried by said chuck means for rotation therewith, a brake drum carried by said chuck means, and a brake shoe associated with said frame and movable into engagement with said drum to retard the rotation of said rotor and said cutting tool.

3. A router comprising an electric motor having a rotor, a base frame adapted to support said motor for rotation of said rotor relative to said base frame, said rotor being adapted to support a cutting tool for rotation therewith, a pair of handles on said frame adapted to guide the cutting tool of said router, a brake drum, means to secure said brake drum to said rotor, a brake lever, means to secure said brake lever to said frame for rotation of said lever about one end thereof, a brake liner on said lever, said brake lever being operable for rotation about said one end to move said liner into engagement with the periphery of said drum to retard the rotation of said cutting tool, and spring means for normally biasing said brake lever to a position where said liner is out of engagement with said drum.

4. A portable electric hand tool such as a router comprising frame structure, a driven rotatable member supported by said frame structure, said driven member having a threaded shaft extension thereon, a tool holder, threaded means for securing said tool holder to said threaded shaft extension for rotation therewith, a brake drum secured to said threaded means for rotation with said shaft extension, handle means on said frame structure for guiding said hand tool, and a brake lever carried by said frame structure and associated with said drum, said brake lever also being associated with said handle means for manipulation by an operator of said hand tool into engagement with said drum without release of said handle means by the operator, thereby permitting the operator to have complete control over said tool while braking said rotatable member to a stop.

5. A hand brake attachment for a portable electric router having a rotor and a frame, said attachment comprising chuck means for removably securing a cutting tool to said rotor, a brake drum carried by said chuck means, and a brake lever having means for securing it to said frame in a position for selective engagement with said brake drum.

6. A hand brake attachment according to claim 5 wherein said brake drum is integral with said chuck means, and said chuck means comprises a central hub portion of said brake drum which portion is internally threaded and is adapted to be threadedly secured to said rotor.

7. A hand brake attachment for a portable electric router having a rotor and a frame having handles thereon by means of which the router may be manually controlled, said attachment comprising a combination brake drum and tool chuck which is provided with a central hub portion internally threaded for threaded connection to the rotor, and a brake lever having means for securing it to the frame in a position adjacent said brake drum, said brake lever having an end associated with one of the handles for manipulation by an operator of the router into engagement with said brake drum without release of the handles by the operator, thereby permitting the operator to have complete control over the router while braking the rotor to a stop.

References Cited in the file of this patent

UNITED STATES PATENTS

| | | |
|---|---|---|
| 1,617,712 | Hess | Feb. 15, 1927 |
| 2,151,274 | Hindman | Mar. 21, 1939 |
| 2,440,322 | Barcroft et al. | Apr. 27, 1948 |
| 2,701,036 | Osborne | Feb. 1, 1955 |
| 2,756,785 | Godfrey | July 31, 1956 |